(12) United States Patent
Batcher

(10) Patent No.: US 7,178,013 B1
(45) Date of Patent: Feb. 13, 2007

(54) REPEAT FUNCTION FOR PROCESSING OF REPETITIVE INSTRUCTION STREAMS

(75) Inventor: Kenneth W. Batcher, Hudson, OH (US)

(73) Assignee: Cisco Technology, Inc., San Jose, CA (US)

(*) Notice: Subject to any disclaimer, the term of this patent is extended or adjusted under 35 U.S.C. 154(b) by 644 days.

(21) Appl. No.: 09/607,815

(22) Filed: Jun. 30, 2000

(51) Int. Cl.
*G06F 9/32* (2006.01)

(52) U.S. Cl. .............. 712/241; 712/228; 712/205; 718/108

(58) Field of Classification Search ........... 712/241, 712/233, 220, 228–229, 205, 43; 718/108
See application file for complete search history.

(56) References Cited

U.S. PATENT DOCUMENTS

| | | | | |
|---|---|---|---|---|
| 4,566,063 A | * | 1/1986 | Zolnowsky et al. | 712/241 |
| 5,579,493 A | * | 11/1996 | Kiuchi et al. | 712/207 |
| 5,727,194 A | * | 3/1998 | Shridhar et al. | 712/241 |
| 5,907,714 A | * | 5/1999 | Boutaud et al. | 712/23 |
| 6,507,921 B1 | * | 1/2003 | Buser et al. | 714/45 |
| 2003/0093656 A1 | * | 5/2003 | Masse et al. | 712/241 |

\* cited by examiner

*Primary Examiner*—Fritz Fleming
*Assistant Examiner*—Tonia L. Meonske
(74) *Attorney, Agent, or Firm*—Tucker, Ellis & West LLP

(57) ABSTRACT

A REPEAT instruction for repeated execution of an associated instruction ($INST_R$). Once a program counter stores the address for the instruction to be repeated, it remains unchanged until the associated instruction ($INST_R$) has been executed the number of times indicated by a COUNT value in a preloaded register, or alternatively, by the REPEAT instruction itself. In this manner, the present invention reduces the number of instruction fetches required to repeatedly execute the associated instruction ($INST_R$). Consequently, there is a significant improvement in the efficiency of the program code execution.

15 Claims, 3 Drawing Sheets

```
Loop Method:

Loop
 MRD [addr],[reg]
 DBcc Loop
```

*Fig. 1A*
PRIOR ART

```
Unrolled Method:

MRD [addr],[reg]
MRD [addr],[reg]
MRD [addr],[reg]
```

*Fig. 1B*
PRIOR ART

```
Load Count
REPEAT
MRD [addr],[reg]
```

*Fig. 2*

| PROGRAM COUNTER (PC) | TRANSITION | OPERATION |
|---|---|---|
| x10 | A | fetch REPEAT instruction |
| x11 | B | fetch instruction to be repeated ($INST_R$) |
| x11 | C | execute $INST_R$ |
| x11 | C | execute $INST_R$ |
| x11 | C | execute $INST_R$ |
| x11 | C | execute $INST_R$ |
| x11 | C | execute $INST_R$ |
| x12 | D | fetch next instruction |

REPEAT FUNCTION FOR PROCESSING OF REPETITIVE INSTRUCTION STREAMS

FIELD OF INVENTION

The present invention generally relates to a system for executing a series of processor instructions, and more specifically a repeat function for efficient processing of repetitive instruction streams.

BACKGROUND OF THE INVENTION

It has been recognized that the performance of embedded central processing units (CPUs) has been impaired due to the need for off-chip memory storage devices. In this regard, embedded CPUs typically take the form of a single-chip processor having some peripheral components on the processor chip. Memory associated with the processor for storing instructions and data is typically located off the processor chip. Accordingly, both processor instructions and data must often be read across a common bus (e.g., "Von Neumann bus") from an off-chip memory storage device. This consumes the bulk of the critical path for items such as "instruction decode" and "memory-to-register" data transfers.

Moreover, off-chip memory storage devices add to the dollar cost of such system incorporating CPUs. Furthermore, off-chip memory storage devices consume valuable real-estate of printed circuit boards (PCBs) which is often at a premium in such arrangements as mini-PCI (Peripheral Component Interconnect) and PCMCIA (Personal Computer Memory Card International Association).

In addition, power consumption is also greatly increased due to performing off-chip memory accesses, which in turn adversely affects the battery life in a wireless application.

In view of the foregoing observations, it has been recognized that an ideal design for processing memory transfer instructions, should seek to: (a) minimize the number of off-chip memory instruction fetch accesses to improve data transfer speed and minimize power consumption, and (b) reduce the size of the off-chip memory storage device to minimize use of real-estate area and production costs. These objective are particularly important in the case of wireless applications which use embedded CPUs.

One way in which the prior art has attempted to address the foregoing problems is by providing an on-chip cache memory. One drawback to this approach is that it adds significant production costs to produce the embedded CPU (e.g., to produce an ASIC). Other drawbacks may include absence of locality-of-reference, coherence problems, and thrashing problems depending on the application.

Another prior art solution has included the use of dual busses, namely a separate instruction bus and data bus (i.e., "Harvard bus"). One drawback of this approach is that a dual bus system is too power hungry and expensive for many embedded CPU applications. Furthermore, the pins needed to provide dual busses are often not available.

Other prior art approaches include the use of a "looping" execution method and an "unrolling" execution method to increase data transfer speed. These and other approaches also have significant drawbacks, as will be discussed below.

SUMMARY OF THE INVENTION

According to the present invention there is provided a method of operating a processor to repeatedly execute at least one associated instruction, the method including the steps of: (a) loading a register with a count value indicative of the number of times the associated instruction is to be executed; (b) fetching and executing a REPEAT instruction indicating the at least one associated instruction to be repeatedly executed; (c) fetching the at least one associated instruction; and (d) executing the at least one associated instruction for as many times as indicated by the count value.

In accordance with another aspect of the present invention there is provided a method of operating a processor to repeatedly execute one or more instructions, the method including the steps of: (a) fetching a REPEAT instruction; (b) executing a REPEAT instruction, wherein execution of the REPEAT instruction stores in a register a count value indicative of the number of times one or more associated instructions are be executed; (c) fetching the one or more associated instructions; and (d) executing the associated instruction for as many times as indicated by the count value.

In accordance with still another aspect of the present invention there is provided a method of operating a processor to repeatedly execute one or more instructions, the method including the steps of: (a) loading a register with a count value indicative of the number of times one or more associated instructions are to be executed; (b) fetching and executing a REPEAT instruction indicating the one or more associated instructions that are to be repeatedly executed; (c) incrementing a program counter; (d) fetching the one or more associated instructions; and (e) executing the one or more associated instruction for as many times as indicated by a count value stored in a count register.

In accordance with yet another aspect of the present invention there is provided a processor for repeatedly execute at least one associated instruction, said processor comprising: load means for loading a register with a count value indicative of the number of times the associated instruction is to be executed; first fetch means for a REPEAT instruction indicating the at least one associated instruction to be repeatedly executed; first execute means for executing the REPEAT instruction indicating the at least one associated instruction to be repeatedly executed; second fetch means for fetching the at least one associated instruction; and first execute means for executing the at least one associated instruction for as many times as indicated by the count value.

In accordance with yet another aspect of the present invention there is provided a processor for repeatedly executing one or more instructions, comprising: first fetch means for fetching a REPEAT instruction; first execute means for executing a REPEAT instruction, wherein execution of the REPEAT instruction stores in a register a count value indicative of the number of times one or more associated instructions are be executed; second fetch means for fetching the one or more associated instructions; and second execute means for executing the associated instruction for as many times as indicated by the count value.

In accordance with yet another aspect of the present invention there is provided a processor for repeatedly executing one or more instructions, comprising: load means for loading a register with a count value indicative of the number of times one or more associated instructions are to be executed; first fetch means for fetching a REPEAT instruction indicating the one or more associated instructions that are to be repeatedly executed; first execute means for executing the REPEAT instruction indicating the one or more associated instructions that are to be repeatedly executed; means for incrementing a program counter; second fetch means for fetching the one or more associated instructions; and second execute means for executing the one or more associated instruction for as many times as indicated by a count value stored in a count register.

In accordance with still another aspect of the present invention there is provided a processor for repeatedly executing one or more processor instructions, said processor comprising: a memory address register associated with a main memory; a memory data register associated with the main memory; a memory control for generating memory control signals; a program counter for storing a memory address location of the main memory where an instruction is to be fetched; an instruction register for storing an instruction that is to be executed; at least one general purpose register; decode and execute control logic for decoding and executing an instruction stored in the instruction register; and a state machine for controlling the fetching and repeated execution one or more associated instructions.

An advantage of the present invention is the provision of a repeat function which minimizes the number of off-chip memory instruction fetch accesses.

Another advantage of the present invention is the provision of a repeat function which conserves power in an embedded processor system, thus maximizing battery life.

Another advantage of the present invention is the provision of a repeat function which minimizes the size of the off-chip memory storage device, thus conserving real estate.

Still another advantage of the present invention is the provision of a repeat function which minimizes production costs of embedded processor systems.

Yet another advantage of the present invention is the provision of a repeat function which allows the use of a Von Neumann bus configuration, but provides the effect of a Harvard bus configuration.

Yet another advantage of the present invention is the provision of a repeat . . . until function that allows for repetition of a group of instructions without an instruction fetch.

Still other advantages of the invention will become apparent to those skilled in the art upon a reading and understanding of the following detailed description, accompanying drawings and appended claims.

BRIEF DESCRIPTION OF THE DRAWINGS

The invention may take physical form in certain parts and arrangements of parts, a preferred embodiment and method of which will be described in detail in this specification and illustrated in the accompanying drawings which form a part hereof, and wherein:

FIG. 1A illustrates exemplary code for the prior art looping execution method;

FIG. 1B illustrates exemplary code for the prior art unrolling execution method; and FIG. 2 illustrates exemplary code for a repeat function according to a preferred embodiment of the present invention;

DETAILED DESCRIPTION OF THE PREFERRED EMBODIMENT

Figures 3, 4:
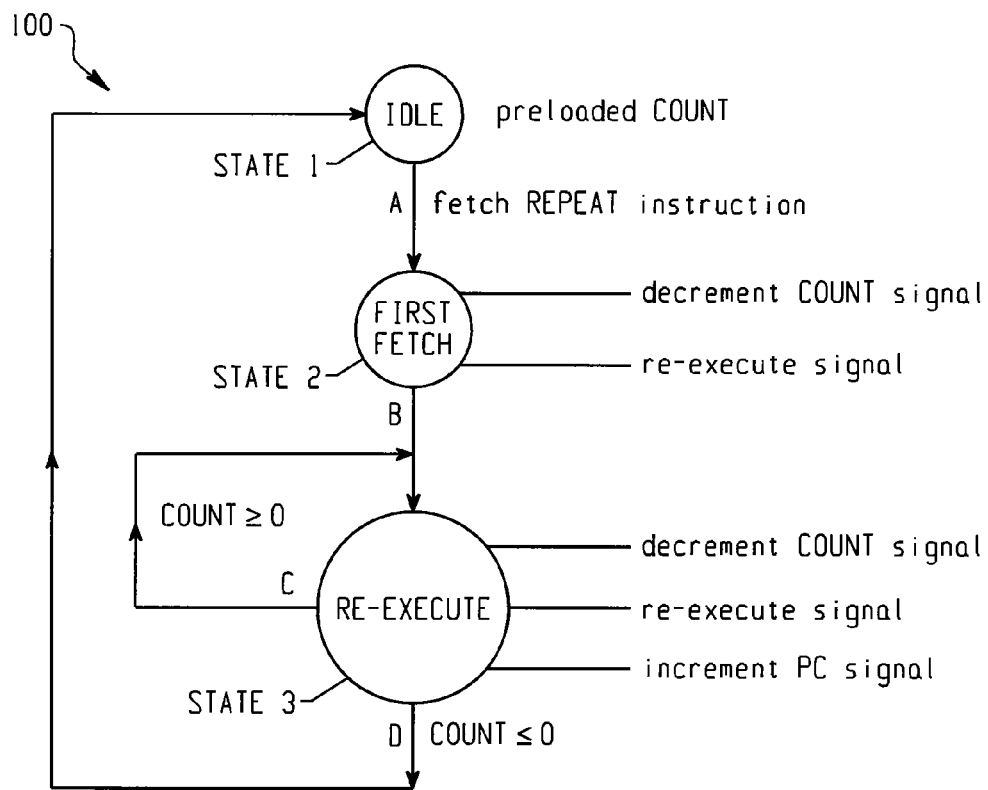
FIG. 3 illustrates a state machine for providing the repeat function according to a preferred embodiment of the present invention.
FIG. 4 illustrates the operation of executing a REPEAT instruction requiring five repeats of an associated instruction, in accordance with the state machine shown in FIG. 1.

In computer program execution, a fetch operation transfers the contents of a specific main memory location to the processor or central processing unit (CPU). To start a fetch operation, the CPU must send the address of the desired memory location to the main memory. The CPU contains a register known as the program counter (PC) that contains the address in the main memory of the instruction to be executed. Execution of a given instruction is generally comprised of a two-phase procedure. In the first phase, called "instruction fetch," the instruction is fetched from the main memory location whose address is in the PC. This instruction is placed in the instruction register (IR) in the CPU. At the start of the second phase, called "instruction execute," the operation field of the instruction in the IR is examined to determine which operation is to be performed. The specified operation is then performed by the CPU. In the case where a shared bus is used for transfer of both instructions and data stored in the main memory (i.e., "Von Neumann bus"), the "fetching" and "execution" of a memory transfer instruction (e.g., memory read (MRD) and memory write instructions), will require use of the same bus.

FIGS. 1A and 1B show prior art methods for executing a series of repetitive instructions, such as memory transfer instructions (MRD—"memory read"). FIG. 1A illustrates a "looping" method, while FIG. 1B illustrates an "unrolling" method. As will be readily understood by those skilled in the art, the looping method requires one instruction fetch operation each time the MRD instruction is encountered, and one instruction fetch operation each time the DBcc ("decrement and branch") instruction is encountered. Thus, each 3 consecutive clock cycles of a single loop consist of: (1) fetch MRD, (2) perform memory data transfer (i.e. execute memory read instruction), and (3) fetch DBcc (decrement and branch). Accordingly, the "looping" method provides an effective data transfer rate of 1 data transfer for every 3 clock cycles on a shared instruction/data bus.

The prior art "unrolling" method shown in FIG. 1B, is somewhat better than the "looping" method. As noted above, one instruction fetch operation is executed each time the MRD ("memory read") instruction is encountered. Thus, each two consecutive clock cycle consists of: (1) fetch MRD, and (2) perform memory data transfer (i.e., execute memory read instruction). Accordingly, the "unrolling" method provides an effective data transfer rate of 1 data transfer for every 2 clock cycles on a shared instruction/data bus. However, it should be understood that the "unrolling" method requires additional memory space for storing the plurality of MRD instructions. Consequently, a larger memory storage device is needed which adds to production cost.

FIG. 2 illustrates a special instruction referred to herein as a REPEAT instruction for repetitively executing an associated instruction. The number of repetitions is specified by a COUNT value preloaded into a register (R0) which said REPEAT instruction is associated with, or alternatively, specified as part of the REPEAT instruction (REPEAT N), where N specifies the number of repetitions. As will be described below, the REPEAT instruction eliminates the need to repetitively fetch on the same bus as a memory transfer. This allows for the same effect as a Harvard bus cycle, but without the added cost of provided separate instruction and data buses.

Referring now to FIG. 3, there is shown a state machine 100 for decoding a REPEAT instruction, according to a preferred embodiment of the present invention. In STATE 1 (IDLE) a COUNT value has been preloaded into a register R0 indicative of the number of times an instruction (referred to herein as $INST_R$) is to be repeated upon encountering a REPEAT instruction. Upon transition from STATE 1 to STATE 2 (FIRST FETCH), a REPEAT instruction is fetched.

In STATE 2, "decrement COUNT" and "re-execute" signals are asserted. Assertion of the "re-execute" signal results in the fetching and execution of the instruction $INST_R$, upon transition from STATE 2 to STATE 3 (RE-EXECUTE). $INST_R$ is the next consecutive instruction following the REPEAT instruction (i.e., the instruction associated with the REPEAT instruction).

In STATE 3, a "re-execute" signal is asserted and if COUNT is greater than zero, and $INST_R$ is again executed. A "decrement count" signal is also asserted to decrement the COUNT by one, each time $INST_R$ is executed. Once the COUNT is less than or equal to zero, an "increment PC" signal is asserted, and there is a transition back to STATE 1. Upon transition to STATE 1, the address stored in the program counter (PC) is incremented.

Figure 5:
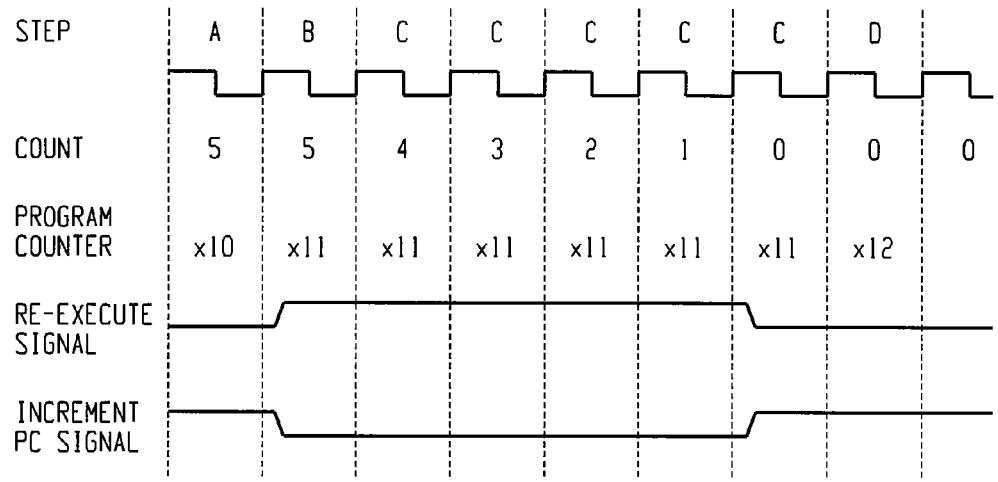
FIG. 5 shows a timing diagram corresponding to the operation shown in FIG. 4.

Referring to FIG. 4, there is shown a table illustrating the a REPEAT instruction for repeating an instruction $INST_R$ five (5) times. "Program counter" refers to the address (hex) stored in the program counter, the "transitions" refer to locations in the state diagram shown in FIG. 3, while the "operation" indicates what type of operation is occurring. A corresponding timing diagram is shown in FIG. 5. As can be seen in FIGS. 4 and 5, the program counter remains unchanged as the same instruction $INST_R$ is repeatedly executed. Once the instruction $INST_R$ has been executed the number of times specified by COUNT, the program counter is incremented.

It should be appreciated that the instruction that is repeated (i.e., $INST_R$) may be any type of instruction, including, but not limited to, memory data transfer instructions, such as memory read (MRD) or memory write instructions, and shift instructions.

In effect, the REPEAT instruction acts as an instruction cache which holds one repeatedly executed instruction (i.e., $INST_R$). Accordingly, the present invention provides the benefits of an on-chip instruction cache, without the expense and problems associated with implementing an instruction cache.

Figure 6:
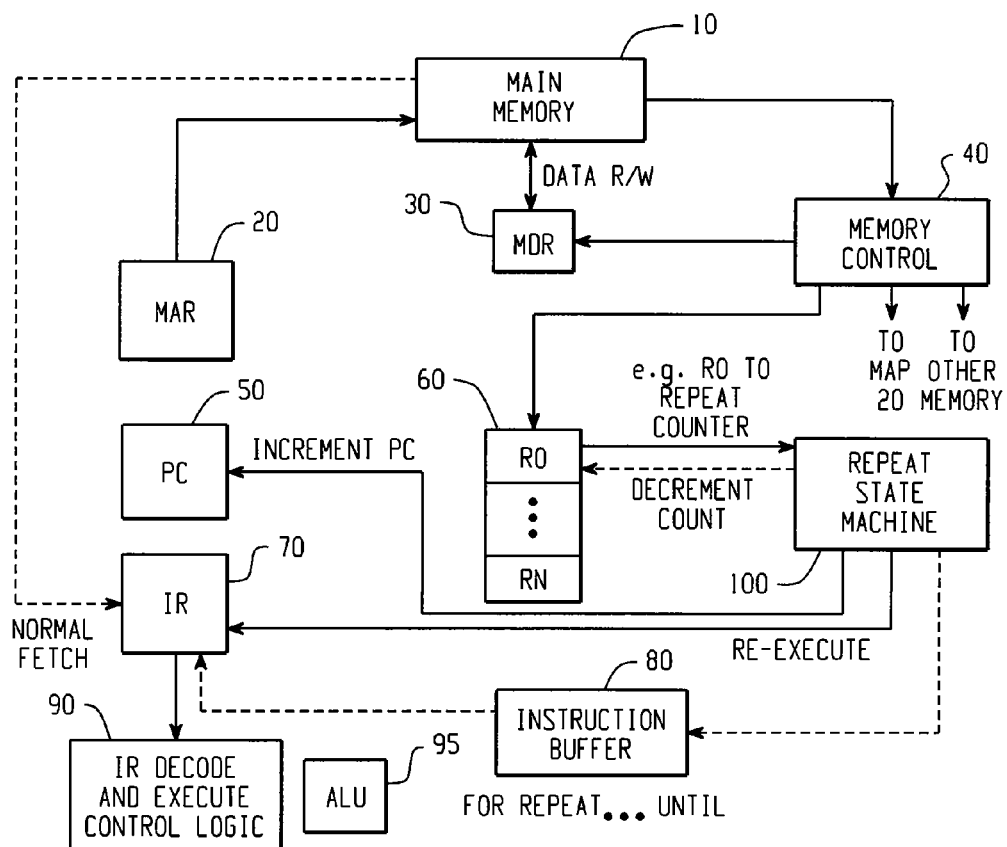
FIG. 6 is a block diagram showing the basic elements of a processor for executing the REPEAT instruction, according to a preferred embodiment of the present invention.

Referring now to FIG. 6, an exemplary processor for implementing the REPEAT instruction is illustrated. It should be appreciated that the processor illustrated in FIG. 6 is provided solely for the purposes of illustrating a preferred embodiment of the present invention, and that other processor designs (including non-RISC processors) may also be used for implementation of the REPEAT instruction of the present invention.

The processor is generally comprised of a memory address register (MAR) 20, a memory data register (MDR) 30, a memory control 40, a program counter (PC) 50, a plurality of registers 60, an instruction register (IR) 70, an instruction buffer 80, an instruction decode and execute control logic 90, an arithmetic logic unit (ALU) 95, and a repeat state machine 100. The processor is connected with a main memory 10 for exchange of data. It should be understood that not all interconnections among the processor elements are shown.

MAR 20 is used to hold the address of the location to or from which data is to be transferred. MDR 30 contains the data to be written into or read out of the addressed location. IR 70 contains the instruction that is being executed. Its output is available to the IR decode and execute control logic 90 that are needed to execute the instruction. PC 50 is a register that keeps track of the execution of a program. It contains the memory address of the instruction currently being executed. A plurality of general purpose registers 60 store various values needed during processing, such as the COUNT value associated with the REPEAT instruction. Programs typically reside in main memory 10 which interfaces with the processor via a bus.

In accordance with a preferred embodiment of the present invention, the processor is a RISC machine. Processor control is hard coded in a preferred embodiment, rather than software microcode. The following register transfer logic (RTL) is implemented for the REPEAT instruction:

IDLE:
    IR ←Fetch [REPEAT instruction]
    PC ←PC+1
    R0 ←R0
    FIRST FETCH ←IDLE (transition A)

FIRST FETCH:
    IR ←[$INST_R$]
    PC ←PC
    R0 ←R0−1
    RE-EXECUTE ←FIRST FETCH (transition B)

RE-EXECUTE:
    IR ←IR
    R0 ←R0−1
    IF (R0>0) THEN
        PC ←PC; RE-EXECUTE ←RE-EXECUTE (transition C)
    ELSE
        PC ←PC+1
        IDLE ←RE-EXECUTE (transition D)

As can be readily appreciated, the REPEAT instruction of the present invention is a significant improvement over the prior art. In this regard, after loading the COUNT and executing REPEAT instruction, one data transfer may be performed every clock cycle on a shared instruction/data bus, where $INST_R$ is a memory read/write instruction. Thus, it can be clearly observed that the present invention is 3 times as efficient as the prior art "looping" method, and is twice as efficient as the prior art "unrolling" method. Moreover, the REPEAT instruction of the present invention provides the added benefit of small code store. In addition, power consumption is also less due to reduced memory traffic. Accordingly, the present invention provides the same effect as a cache memory, but without the drawbacks inherent with use of a cache memory.

It should be further appreciated that the REPEAT instruction of the present invention does not need an instruction fetch, as required in the case of a "loop caching" method. In this regard, the program counter is effectively stalled on the same instruction which gets executed over and over again. With "loop caching" an instruction cache fetch must still be performed. "Loop caching" refers to an instruction caching variation which seeks to prioritize the caching of instruction streams which loop. Since a fetch instruction phase is required for "loop caching," performance will suffer. Moreover, there is the drawback with caching in regards to hardware overhead, and penalty for cache miss which is further elaborated below with regards to context switching.

In a further embodiment of the present invention, the REPEAT instruction takes the form of a REPEAT . . . UNTIL instruction using a multiple instruction buffer. In this regard, multiple instructions are repeatedly executed. The REPEAT . . . UNTIL instruction achieves the same advantage provided by "loop caching" so that the number of off-chip fetch operations are reduced. The key difference is that the REPEAT . . . UNTIL instruction utilizes an instruction buffer 80 (FIG. 6), rather than an instruction cache. Thus, as with the REPEAT instruction, multiple instruction fetches are not required. The contents of instruction buffer 80 are loaded from the operations nested between the REPEAT and the UNTIL program statements.

It should be understood that with context switching, the "loop caching" method described above will suffer. In this regard, the loop can become un-cached when the next context executes, since the locality of reference is lost. Therefore, when the suspended code thread is resumed, the loop performance may suffer. In the presence of very rapid context switching ("thrashing") loop instruction caches can thus become useless. However, the REPEAT instruction and the REPEAT . . . UNTIL instruction do not have this drawback, since the contents of the instruction buffer are locked in and are preserved while the context is pre-empted. Thus, resumption of a switched context that was using a REPEAT or REPEAT . . . UNTIL instruction does not suffer in performance. In should be appreciated that, in effect, the REPEAT instruction has an instruction buffer containing one instruction.

The utility of using the REPEAT instruction to execute a single instruction over and over again, should be fully appreciated. In the case of code threads that rapidly context switch in a pre-emptive multi-tasking environment, repetition of instructions is of particular importance. For example, a MRD (memory read) instruction can be used to target a FIFO memory, which needs servicing by a code thread. The instruction contains a side effect which suspends the active context until it is interrupted (e.g., the FIFO needs servicing again). Hence, the instruction loop includes one instruction which needs to be continuously executed until the desired amount of data has been sent to the FIFO. For example, the following program code sample will read with post increment (address contents of register R0) from memory to FIFO 100 times, and suspend that context until next time of service after each read is performed.

REPEAT 100
MRD [R0]+, FIFO, WAIT

An example of REPEAT . . . UNTIL is as follows:

REPEAT 100
  MRD [R1]+, R2
  MRD [R3]+, R4
  ADD R7, R2, R4
  MWR [R5]+, R7
UNTIL

This loop reads data into registers R2 and R4 using post increment address contents of register R1 and R3. The result is added and placed into register R7, where it is stored to memory at the R5 address, post increment. This is done 100 times in a row per the REPEAT N instruction (where N=100).

The present invention has been described with reference to a preferred embodiment. Obviously, modifications and alterations will occur to others upon a reading and understanding of this specification. It is intended that all such modifications and alterations be included insofar as they come within the scope of the appended claims or the equivalents thereof.

The invention claimed is:

1. A method of operating a processor to repeatedly execute an instruction in a pre-emptive multi-tasking environment, comprising:
determining at run time how many times a single instruction is to be repeated;
loading at run time an existing general purpose register with a count value indicative of the number of times a single instruction is to be executed;
fetching and executing a REPEAT instruction, the REPEAT instruction indicating the single instruction to be repeatedly re-executed;
fetching the single instruction;
repeatedly executing the single instruction for a consecutive number of times as indicated by the count value without refetching the single instruction and without adding a NOP (no operation) instruction;
adjusting the count value in the register each time the single instruction is executed;
suspending the repeatedly executing the single instruction step while a second context executes; and
resuming the repeatedly executing the single instruction after the second context executes;
wherein contents of an instruction buffer containing the single instruction are locked and preserved while the second context executes.

2. A method according to claim 1, wherein said count value is stored before execution of said REPEAT instruction.

3. A method according to claim 1, wherein said REPEAT instruction includes the count value that is stored in said count register, wherein execution of the REPEAT instruction stores the count value in said count register.

4. A method according to claim 1, further comprising:
incrementing the program counter after the one or more associated instructions have been executed for as many times as indicated by the count value.

5. A method according to claim 1, wherein the adjusting the count value further comprises:
decrementing said count value stored in said register each time said one or more associated instructions are executed; and
determining whether said count value is less than or equal to zero.

6. A processor configured to repeatedly execute an instruction in a pre-emptive multi-tasking environment, comprising:
means for determining at run time how many times a single instruction is to be repeated;
means for loading at run time an existing general purpose register with a count value indicative of the number of times a single instruction is to be executed;
means for fetching and executing a REPEAT instruction, the REPEAT instruction indicating the single instruction to be repeatedly re-executed;
means for fetching the single instruction;
means for repeatedly executing the single instruction for a consecutive number of times as indicated by the count value without refetching the single instruction and without adding a NOP (no operation) instruction;
means for adjusting the count value in the register each time the single instruction is executed;
means for suspending the repeatedly executing the single instruction step while a second context executes; and means for resuming the repeatedly executing the single instruction after the second context executes;

wherein contents of an instruction buffer containing the single instruction are locked and preserved while the second context executes.

7. A processor according to claim 6, wherein said count value is stored before execution of said REPEAT instruction.

8. A processor according to claim 6, wherein said REPEAT instruction includes the count value that is stored in said register, wherein the means for fetching and executing the REPEAT instruction stores the count value in said register.

9. A processor according to claim 6, further comprising:
means for incrementing the program counter after the one or more associated instructions have been executed for as many times as indicated by the count value.

10. A processor according to claim 6, wherein the means for adjusting the count value further comprises:
means for decrementing said count value stored in said register each time said one or more associated instructions are executed; and
means for determining whether said count value is less than or equal to zero.

11. A processor for repeatedly executing one or more processor instructions, said processor comprising:
a memory address register associated with a main memory;
a memory data register associated with the main memory;
a memory control for generating memory control signals;
a program counter for storing a memory address location of the main memory where an instruction is to be fetched;
an instruction register for storing an instruction that is to be executed;
at least one general purpose register;
decode and execute control logic for decoding and executing an instruction stored in the instruction register; and
a state machine for controlling the fetching and repeated execution of one or more associated instructions
wherein the processor is operating in a pre-emptive multitasking environment, further comprising the processor configured to suspend executing the instruction in the instruction register while a second context execute, and the processor is configured to resume executing the instruction in the instruction register after the second context executes;
wherein contents of an instruction buffer are locked and preserved while the second context executes.

12. A processor according to claim 11, wherein said general purpose register includes a first register for storing a count value indicative of the number of times the one or more associated instructions are to be repeatedly executed.

13. A processor according to claim 12, wherein said state machine generates signals for decrementing the count value stored in the first register.

14. A processor according to claim 11, wherein said state machine generates a signal for executing an instruction stored in said instruction register.

15. A processor according to claim 11, wherein said state machine generate a signal for incrementing said program counter.

* * * * *